US006719836B2

(12) United States Patent
Nederlof et al.

(10) Patent No.: US 6,719,836 B2
(45) Date of Patent: Apr. 13, 2004

(54) WATER-BASED TWO COMPONENT PROTECTIVE COATING COMPOSITIONS

(75) Inventors: Arnold Johan Nederlof, Santpoort-Noord (NL); Cors Daniël van Zanten, XPAlphen a/d Rijn (NL); Jan de Jong, Zaandam (NL); Cornelis Hubertus van Vliet, Uithoorn (NL)

(73) Assignee: Sigma Coatings B.V., Uithoorn (NL)

( * ) Notice: Subject to any disclaimer, the term of this patent is extended or adjusted under 35 U.S.C. 154(b) by 243 days.

(21) Appl. No.: 09/956,776

(22) Filed: Sep. 20, 2001

(65) Prior Publication Data

US 2002/0056400 A1 May 16, 2002

(30) Foreign Application Priority Data

Sep. 25, 2000 (BE) ............................................. 00203303

(51) Int. Cl.[7] ................................................ C09D 1/00
(52) U.S. Cl. ................................................ 106/287.11
(58) Field of Search .................................. 106/287.11

(56) References Cited

U.S. PATENT DOCUMENTS

| 4,277,284 A | | 7/1981 | Ginsberg et al. |
| 4,523,002 A | * | 6/1985 | Campbell et al. ............. 528/26 |
| 4,605,446 A | * | 8/1986 | Isozaki ................... 106/287.12 |
| 4,933,381 A | | 6/1990 | Hager |
| 5,008,154 A | | 4/1991 | Meddaugh |
| 5,178,675 A | * | 1/1993 | Sexsmith ................ 106/287.11 |
| 5,362,772 A | | 11/1994 | Uhlianuk et al. |
| 5,580,371 A | | 12/1996 | Falberg |
| 5,618,860 A | | 4/1997 | Mowrer et al. |
| 5,703,178 A | | 12/1997 | Gasmena |
| 5,744,243 A | | 4/1998 | Li et al. |
| 5,888,280 A | | 3/1999 | Montes |
| 6,251,989 B1 | * | 6/2001 | Edelmann et al. ........... 524/837 |
| 6,281,321 B1 | * | 8/2001 | Kelly et al. ..................... 528/17 |
| 6,432,191 B2 | * | 8/2002 | Schutt .................... 106/287.13 |
| 6,538,092 B1 | * | 3/2003 | Terry et al. ..................... 528/26 |

FOREIGN PATENT DOCUMENTS

| EP | 0 346 385 B1 | 1/1994 |
| JP | 09169846 A | 6/1997 |
| JP | 09241576 A | 9/1997 |
| WO | WO 94/29390 | 12/1994 |
| WO | 9429390 | 12/1994 |
| WO | WO 95/08515 | 3/1995 |
| WO | 9858028 | 12/1998 |
| WO | WO/98/58028 | 12/1998 |
| WO | WO 99/14399 | 3/1999 |
| WO | WO 00/55260 | 9/2000 |

* cited by examiner

Primary Examiner—Elizabeth Wood
(74) Attorney, Agent, or Firm—Goodwin Procter LLP

(57) ABSTRACT

Water-based protective coating compositions contain as binder the product obtained by the reaction of an aminosilane, in acid solution, with a sub-stoechiometric amount of an epoxysilane, and further contain finely divided zinc and dispersed pigments.

3 Claims, No Drawings

WATER-BASED TWO COMPONENT PROTECTIVE COATING COMPOSITIONS

The present invention relates to water-based two-component protective coatings for steel. In particular, it relates to heat resistant protective coating compositions. More particularly, it relates to water-based weldable shop primers.

Rolled steel for the heavy steel construction industry (such as the ship-building industry) is generally blasted on-line using automated procedures and immediately coated with a thin layer of a protective coating called shop primer or pre-construction primer.

The requirements for shop primers are multiple:
(i) as to the liquid primers:
  both their shelf-life and pot-life should be sufficient;
  they should be easily sprayable, particularly in thin layers;
  they should dry fairly rapidly;
(ii) as to the dry coatings:
  they should provide a good protection against corrosion until overcoated;
  they should have a good mechanical resistance;
  they should not interfere with the welding and cutting operations;
  they should withstand the welding and cutting operations;
  they should not induce health hazards during welding operations;
  they should be compatible (particularly overcoatable) with the further coatings to be applied.

Silicate-based shop primers are known in the art. EP-A-346385 discloses shop primer compositions comprising:
(i) fillers and pigments, at least 25 wt % of which have electrical conductive properties;
(ii) zinc powder, dust or flakes, in a weight ratio of 1:6 to 1:1 to the total amount of fillers and pigments;
  said zinc, fillers and pigments being milled to a sufficient fineness;
(iii) anti-settling agents;
(iv) optionally, thickening agents;
(v) a silicate-type binder, in an amount such that the weight ratio of the $SiO_2$ content of said binder to the total amount of zinc, fillers and pigment is of 1:4 to 1:16; and
(vi) solvents.

Such compositions contain solvents; it is a general trend in the coatings industry to demand a reduction in the use of solvents.

Water-based protective coatings for steel are already known. U.S. Pat. No. 5,580,371 disclosed water-based coating compositions comprising zinc, iron phosphide and potassium silicate. U.S. Pat. No. 5,888,280 disclosed water-based protective coating compositions prepared by combining in the presence of water (i) zinc dust, (ii) a Group IA metal silicate, (iii) a colloidal silica ingredient that is modified with a Group IA metal silicate, and (iv) a carbonate-containing internal hardener. Such compositions however are strongly alkaline; this is found to be generally detrimental to the overcoatability of the shop primer coating.

There is accordingly a need in the art for providing an improved protective coating composition. Thus, it is an object of the invention to provide a shop primer composition that would be water-based and that would not be strongly alkaline. This and other objects are achieved by the compositions of the invention.

The compositions of the present invention are normally two-component compositions that after mixing essentially consist of the following components in aqueous solution:
(a) from the first component:
  (i) at least one omega-aminoalkyl trialkoxysilane;
  (ii) at least one strong acid, in an amount sufficient to obtain a pH of 7 to 9;
  (iii) at least one compound each having as terminal groups a trialkoxy or alkyldialkoxy silane and an epoxy group, in an amount such that the ratio of the amine hydrogen equivalent of the omega-aminoalkyl trialkoxysilanes to the epoxy equivalent of the said compound is of 3 to 7; the reaction of (i) to (iii) forming a binder;
  (iv) one or more pigments, at least 25 wt % of which having conductive properties;
(b) from the second component:
  (v) finely divided zinc, the weight ratio of zinc to pigments being of from 1:10 to 10:1;
the weight ratio of solid binder to the total of zinc and pigments being of 1:1 to 1:50.

Omega-aminoalkyl trialkoxysilanes (hereinafter the aminosilanes) may be represented by the general formula $NH_2$—R'—Si(OR")$_3$; as used in organic chemistry, omega defines the terminal location for a substituent or function. R' is an alkylene group, preferably containing 1 to 6 carbon atoms, more preferably 2 to 4, most preferably 3; also R' is preferably a n-alkylene group. Each R" is an alkyl group which may be the same or different, preferably containing 1 to 6 carbon atoms, more preferably 1 to 4, most preferably 2 or 3; also, R" is preferably a n-alkyl group. The most preferred compound is 3-aminopropyl triethoxy silane.

As acid, there can be used any strong or relatively strong acid, preferably organic. Preferred acids include formic acid, acetic acid, oxalic acid and mixtures thereof. The most preferred acid is formic acid, which is one that contributes least organic matter among the organic acids. The amount of acid added must be such as to obtain a pH of 7 to 9, preferably of 7.5 to 8.5, most preferably of about 8.

Among the compounds having an epoxy terminal group and a trialkoxy silane terminal group (hereinafter the epoxysilanes), linear compounds are preferred. According to a preferred embodiment, there can be used any compound of general formula $CH_2$—O—CH—R'—Si(OR")$_3$, with R' and each R" as above. According to another preferred embodiment, there is alternatively used a compound of general formula $CH_2$—O—CH—R'—O—R'—Si(OR")$_3$, with each R' (which may be the same or different) and each R" as above. According to yet another preferred embodiment, there is used a compound of general formula $CH_2$—O—CH—R'—Si R"(OR")$_2$ or $CH_2$—O—CH—R'—O—R'—Si R"(OR")$_2$, wherein each R' and each R" is as above. The most preferred compounds are 3-glycidoxypropyl trimethoxy and triethoxysilane. The amount of epoxysilanes added is such that the ratio of the amine hydrogen equivalent of the aminosilane to the epoxy equivalent of the epoxysilane is of 3 to 7, preferably of 4 to 6, more preferably of 4.5 to 5.5, most preferably of about 5. Higher ratios decrease the water resistance of the coating, whereas lower ratios decrease the shelf life of the first component of the composition, without improving the water resistance of the coating.

Finely divided zinc is used as anti-corrosive agent, effective because of its galvanic action on the steel substrate. Zinc powder, zinc dust or zinc flakes can be used.

Conductive pigments improve both the anti-corrosive properties (by electrically connecting zinc particles with the substrate) and the arc welding properties. Examples of pigments known to have conductive properties include ferro alloy, di-iron phosphide, micaceous iron oxide types, copper flakes, nickel flakes, stainless steel flakes, aluminium flakes. Conductive pigments should represent at least 25 wt % of all pigments, preferably at least 40 wt %, more preferably at least 50 wt %.

The pigments may optionally comprise an amount of materials that can interact with the steel substrate, resulting e.g. in some inhibition or passivation of said substrate. This is assumed to slow the consumption of the finely divided zinc. Examples of pigments having such properties include molybdates, phosphates like calcium diphosphate, zinc phosphate, sodium potassium polyphosphate or aluminium polyphosphate, or borates like zinc metaborate or barium metaborate, or zinc oxide.

Pigments believed to be inactive are obviously not essential to the invention, but their inclusion in the composition is often desired, e.g. for economical reasons (fillers) or to provide the primer with a desired colour. As example of the numerous possible inactive pigments, it may be cited titanium dioxide, red iron oxide, calcium carbonate, talc, aluminium silicate, yellow iron oxide, and aluminium silicate.

The pigments are normally provided with the first component, wherein they have been previously dispersed.

The weight ratio of zinc to the total amount of pigments is of 1:10 to 10:1, preferably of 1:2 to 8:1, more preferably from 2:3 to 6:1, most preferably from 1:1 to 4:1.

The weight ratio of solid binder to the total of zinc and pigments is of 1:1 to 1:75, preferably of 1:3 to 1:65, more preferably of 1:10 to 1:60, most preferably of 1:20 to 1:60.

The composition may further comprise typical additives when desired, such as pigment and/or substrate wetting agents, thickening agents or anti-settling agents. Typical thickening agents are acrylate polymers or hydroxyethylcellulose polymers; when used, they are added in amounts of up to 1 wt %. Typical anti-settling agents are clay-type materials like bentonite, glycerol trihydroxystearate, polyamides or polyethylene wax; when used, they are added in amounts of up to 4 wt %, preferably up to 2 wt %. Typical substrate wetting agents are ethoxylated alcohols (e.g. the product with CAS RN=68439-45-2).

The amount of solids (i.e. of all components that will remain in the dry coating) in the coating compositions can vary widely; it is preferably of from 25 to 40 vol %.

According to a preferred embodiment, the protective coating compositions essentially consisting of the following components in aqueous solution:
  a) from the first component:
    (i) 3-aminopropyl triethoxy silane;
    (ii) formic acid, in an amount sufficient to obtain a pH of 7 to 9;
    (iii) a compound selected from the group consisting of 3-glycidoxypropyl trimethoxy silane and 3-glycidoxypropyl triethoxy silane, in an amount such that the ratio of the amine hydrogen equivalent of the omega-aminoalkyl trialkoxysilanes to the epoxy equivalent of the said compound is of 4 to 6;
    (iv) one or more pigments, at least 50 wt % of the pigments having conductive properties;
  b) from the second component:
    (v) finely divided zinc, the weight ratio of zinc to pigments being of from 1:1 to 4:1;
  the weight ratio of solid binder to the total of zinc and pigments being of 1:20 to 1:60.

The compositions are preferably prepared according to the process of the invention. The present invention further comprises a process for preparing the first component of a two-component protective coating composition, which essentially consists of the steps of:
  (1) mixing water and at least one aminosilane, to form a first mixture;
  (2) at a temperature of at most 40° C., adding to the first mixture at least one strong acid, in an amount such as to obtain a pH of 7 to 9, to form a second mixture;
  (3) dispersing one or more pigments into the second solution, at least 25 wt % of said pigments having conductive properties, to form a third mixture;
  (4) at a temperature of at most 40° C., adding to the third mixture at least one epoxysilane, the ratio of the amine hydrogen equivalent of the aminosilanes to the epoxy equivalent of the epoxysilane being of 3 to 7, to obtain the first component.

In step (2), the temperature should be of at most 40° C. before the addition of the acid. This is believed necessary to increase the shelf life of the first component. Preferably, the temperature should be of at most 35° C., more preferably of at most 30° C., most preferably of at most 25° C.

In step (4), the temperature should be of at most 40° C. before the addition of the epoxysilanes. This is believed necessary to increase the shelf life of the first component. Preferably, the temperature should be of at most 35° C., more preferably of at most 30° C., most preferably of at most 25° C.

In step (3) the dispersion can be made using any conventional apparatus, such as e.g. the apparatus known as a high-speed dissolver.

The process for preparing the two-component protective coating compositions of the invention essentially consists of the steps of:
  (a) preparing the first component;
  (b) at a moment separated from the time of application by not more than the pot life of the composition, adding to the first component an amount of finely divided zinc such that the weight ratio of zinc to pigments is of 1:10 to 10:1, the weight ratio of solid binder to the total of zinc and pigments being of 1:1 to 1:75.

Once prepared, the compositions of the invention generally have a pot life of at least 16 hours, i.e. longer than a workday. In other words, the protective coating compositions need to be prepared only once a day.

The protective coating compositions of the invention are generally used as shop primers, with a zinc content in the higher portion of the disclosed range. They can find other uses, such as heat-resistant protective coating to protect steel elements to be subjected to high temperatures.

EXAMPLE 1

Shop Primer (Low Zinc Content)

First component: in a mixing tank, the following components were added in the indicated order:

| | |
|---|---|
| water | 08.450 parts by weight (pbw) |
| 3-aminopropyl triethoxysilane | 03.640 pbw |
| then after cooling to 25° C.: | |
| 49.5 wt % solution of formic acid | 01.105 pbw |
| then after additional mixing for 30 minutes: | |
| non-conductive pigments | 16.640 pbw |
| conductive pigments | 21.125 pbw |

The resulting mixture was dispersed in a high-speed dissolver for 30 minutes. After cooling down to 25° C., the following components were added in the indicated order:

| | |
|---|---|
| water | 08.125 pbw |
| 3-glycidoxypropyl trimethoxysilane | 01.560 pbw |
| 1 wt % solution of substrate wetting agent | 04.355 pbw (solvent = water) |

The resulting first component was stored for two days in a can at room temperature. It was then mixed with the second component:

| | |
|---|---|
| zinc dust | 35.000 pbw (total of 100 parts) |

In this example, the conductive pigments represented 77 wt % of the pigments, the weight ratio of zinc to pigments was of 1:1.1, and the weight ratio of the solid binder to the total of zinc and pigments was of 1:25.

The resulting water-based shop primer had a pH of about 8; it was air-sprayed at 23° C. and 50% relative humidity on thick plates of shot-blasted steel Sa2½ (substrate temperature: about 40° C.) at 0.025 mm dry film thickness. The shop primer coating was dry-to-handle after about 10 minutes when air heated to about 35° C. was blown along the panel; a water-resistant red-brown coating was obtained within 6 hours. In the dry coating, zinc represented about 30 vol %.

After 7 months exposure outdoors in Amsterdam, the corrosion resistance afforded by the shop primer was still excellent.

After 7 months storage, the panels were tested for overcoatability. At a temperature of 15° C., there was successively applied on the panels (substrate temperature: 18° C.) with a roller:

a primer commercially available from SIGMA COATINGS under the trade name SIGMA UNIVERSAL PRIMER (125 um wet film thickness, 60 um dry film thickness); then after 135 minutes drying.

A topcoat commercially available from SIGMA COATINGS under the trade name SIGMA MULTIGUARD (350 um wet film thickness, 300 um dry film thickness).

After one week, the adhesion was tested by means of a pull-off test according to ASTM D4541. The average of two measurements was 10.5 MPa (N/mm²).

MIG/MAG weldability was evaluated as follows. The shop primer was applied on shot blasted steel panels at 25 μm dry film thickness. After outdoor weathering for one week after application of the shop primer, two panels were welded together, using the following parameters:

| | |
|---|---|
| Welding configuration: | T-joint; gap < 0.05 mm (panels were tightly pressed during tack-welding). |
| Welding equipment: | Kemppi PRO MIG500/PRO5000. |
| Welding position: | 2F (horizontal) automatic two sides respectively; directly after making the first (leading) weld, the panel was turned and the second (trailing) weld was made. |
| Shielding gas: | 80% Ar, 20% CO₂ (AGA Mison 20) at a flow rate of 20 L/min. |
| Welding wires and parameters: | (a) solid wire: ESAB Autrod 12.51 SG-2, 1.2 mm diameter, 70 cm/min, 34 V, 310–340 A; (b) metal cored wire: Filarc PZ6105R, 1.4 mm diameter, 70 or 89 cm/min, 30 V, 300–330 A. |
| Determination of porosity: | the weld seams were opened by acetylene-oxygen gouching to determine the internal porosity. |

The results were as follows (expressed as the number of pores observed per 40 cm of weld seam, leading/trailing):

| wire type and welding speed | external porosity | internal porosity |
|---|---|---|
| solid wire; 70 cm/min | 0/0 | 1/4 |
| metal cored wire; 70 cm/min | 0/0 | 1/5 |
| metal cored wire; 89 cm/min | 0/0 | 3/8 |

Comparison Example A

For comparison purposes, the experiment was repeated using as shop primer the composition described in Example 8 of EP-A-346385.

The average of two pull-off measurements was of 9.5 MPa (N/mm2).

The results of the MIG/MAG welding experiments were as follows:

| wire type and welding speed | external porosity | internal porosity |
|---|---|---|
| solid wire; 70 cm/min | 0/0 | 3/4 |
| metal cored wire; 70 cm/min | 0/0 | 0/1 |
| metal cored wire; 89 cm/min | 0/0 | 0/3 |

EXAMPLE 2

Shop Primer (High Zinc Content)

The process of preparation of example 1 was repeated, using the following amounts:

First Component:

| | |
|---|---|
| water | 05.453 pbw |
| 3-aminopropyl triethoxysilane | 01.804 pbw |
| 49.5 wt % solution of formic acid | 00.533 pbw |
| conductive pigment | 16.122 pbw |
| non-conductive pigment | 02.000 pbw |
| water | 12.136 pbw |
| 3-glycidoxypropyl trimethoxysilane | 00.779 pbw |
| 1 wt % solution of substrate wetting agent | 02.173 pbw (solvent = water) |

Second Component

| | |
|---|---|
| zinc dust | 59.000 pbw for a total of 100 parts. |

In this example, the conductive pigments represent 97 wt % of all pigments, the weight ratio of zinc to pigments is of 3.3:1 and the weight ratio of the solid binder to the total of zinc and pigments is of 1:53. In the dry coating, zinc represented about 58 vol %.

The resulting water-based heat-resistant protective coating composition was air-sprayed at 23° C. and 50% relative humidity on shot-blasted steel Sa2½ (substrate temperature: between 35 and 40° C.) at 0.025 mm dry film thickness. The shop primer was dry-to-handle after about 10 minutes when air heated to about 35° C. was blown along the panel. A water-resistant grey coating was obtained within 6 hours.

After 9 months exposure outdoors in Amsterdam, the corrosion resistance afforded by the coating was still excellent.

What is claimed:

1. Protective coating compositions essentially consisting of the following components in aqueous solution:
   a) for the first component:
      (i) at least one omega-aminoalkyl trialkoxy silane;
      (ii) at least one acid, in an amount sufficient to obtain a pH of 7 to 9;
      (iii) at least one compound each having as terminal groups a trialkoxy or alkyldialkoxy silane and an epoxy group, in an amount such that the ratio of the amine hydrogen equivalent of the omega-aminoalkyl trialkoxysilanes to the epoxy equivalent of the said compound is of 3 to 7; the reaction of (i) to (iii) forming a binder;
      (iv) one or more pigments, at least 25 wt % of the pigments having conductive properties;
   for the second component:
      (v) zinc particles, the weight ratio of zinc to pigments being of from 1:10 to 10:1; the weight ratio of solid binder to the total of zinc and pigments being of 1:1 to 1:75.

2. Protective coating compositions according to claim 1, essentially consisting of the following components in aqueous solution:
   a) for the first component
      (i) 3-aminopropyl triethoxy silane;
      (ii) formic acid, in an amount sufficient to obtain a pH of 7 to 9;
      (iii) a compound selected from the group consisting of 3-glycidoxypropyl trimethoxy silane and 3-glycidoxypropyl triethoxy silane, in an amount such that the ratio of the amine hydrogen equivalent of the omega-aminoalkyl trialkoxysilanes to the epoxy equivalent of the said compound is of 4 to 6;
      (iv) one or more pigments, at least 50 wt % of the pigments having conductive properties;
   b) for the second component:
      (v) zinc particles, the weight ratio of zinc to pigments being of from 1:1 to 4.1;
   the weight ratio of solid binder to the total of zinc and pigments being of 1:20 to 1:60.

3. The composition of claim 1, in which the at least one acid is an organic acid.

* * * * *